United States Patent [19]
Wu

[11] Patent Number: 5,909,992
[45] Date of Patent: Jun. 8, 1999

[54] SELF-TAPPING SCREW FOR FASTENING A METAL CORRUGATED BOARD

[76] Inventor: Tsan-Hsing Wu, No. 42, Kee Koou St., Shin Her Tsun, Shin Shyh Hsiang, Tai-Nan Hsien, Taiwan

[21] Appl. No.: 09/109,068

[22] Filed: Jul. 2, 1998

[51] Int. Cl.⁶ .............................. F16B 25/00; F16B 35/04
[52] U.S. Cl. .......................... 411/387; 411/399; 411/413
[58] Field of Search ................................ 411/386, 387, 411/399, 426, 412, 413

[56] References Cited

U.S. PATENT DOCUMENTS

| 4,878,793 | 11/1989 | Hewison | 411/387 |
| 5,433,570 | 7/1995 | Koppel | 411/387 X |

FOREIGN PATENT DOCUMENTS

| 2853976 | 6/1980 | Germany | 411/387 |
| 44366 | 4/1977 | Japan | 411/413 |

*Primary Examiner*—Neill Wilson
*Attorney, Agent, or Firm*—Browdy and Neimark

[57] ABSTRACT

A self-tapping screw consists of a head and a threaded shank which is provided with a blade, a first threaded portion contiguous to the blade, and a second threaded portion contiguous to the head and greater in length, tooth pitch and tooth depth than the first threaded portion. The self-tapping screw is fastened onto a corrugated board such that the blade and the first threaded portion are securely embedded in a girder, and that the second threaded portion is securely embedded in an insulation layer located between the corrugated board and the girder.

3 Claims, 1 Drawing Sheet

SELF-TAPPING SCREW FOR FASTENING A METAL CORRUGATED BOARD

FIELD OF THE INVENTION

The present invention relates generally to a screw, and more particularly to a self-tapping screw for fastening a metal corrugated board.

BACKGROUND OF THE INVENTION

The conventional self-tapping screws are commonly used for fastening the metal corrugated boards to the roof of a structure or to a metal girder of the side walls of the structure. The tooth pitch and the tooth depth of the conventional self-tapping screws are kept relatively small so as to avert the damage or destruction of the advancing spiral ridge of the conical shank of the conventional self-tapping screw at the time when the conventional self-tapping screws is fastened onto a metal girder.

In order to prevent the room temperature from rising excessively, the metal corrugated boards and the horizontal metal girders of the structure are provided therebetween with an insulating layer of the polyurethane (PU) foam material or glass fiber cotton material. The conventional self-tapping screws do not engage well with the insulating layer described above.

SUMMARY OF THE INVENTION

The primary objective of the present invention is therefore to provide an improved self-tapping screw capable of fastening securely a corrugated board with a girder, as well as an insulating layer located between the corrugated board and the girder.

In keeping with the principle of the present invention, the foregoing objective of the present invention is attained by the self-tapping screw consisting of a head, a threaded shank fastened at one end thereof with the head, and a blade located at the free end of the threaded shank. The threaded shank is provided with a first threaded portion contiguous to the blade, and a second threaded portion contiguous to the head. The tooth pitch and the tooth depth of the first threaded portion are smaller than those of the second threaded portion.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
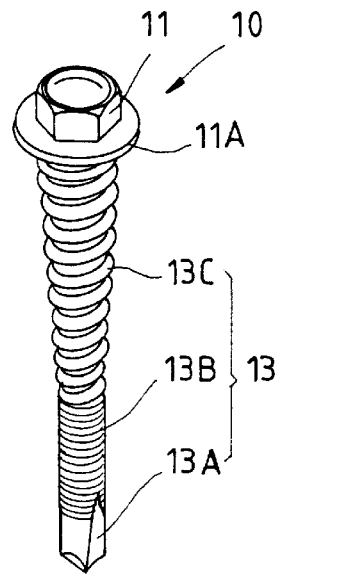
FIG. 1 shows a perspective view of the preferred embodiment of the present invention.
Figure 2:
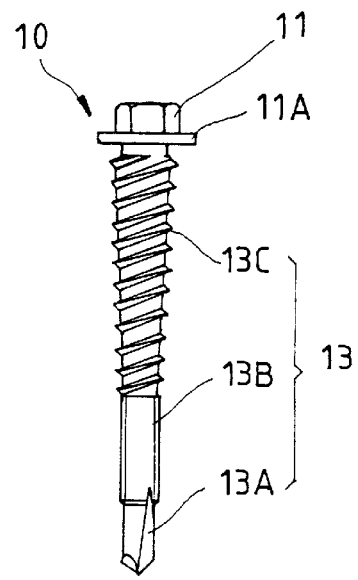
FIG. 2 shows a planar view of the preferred embodiment of the present invention.
Figure 3:
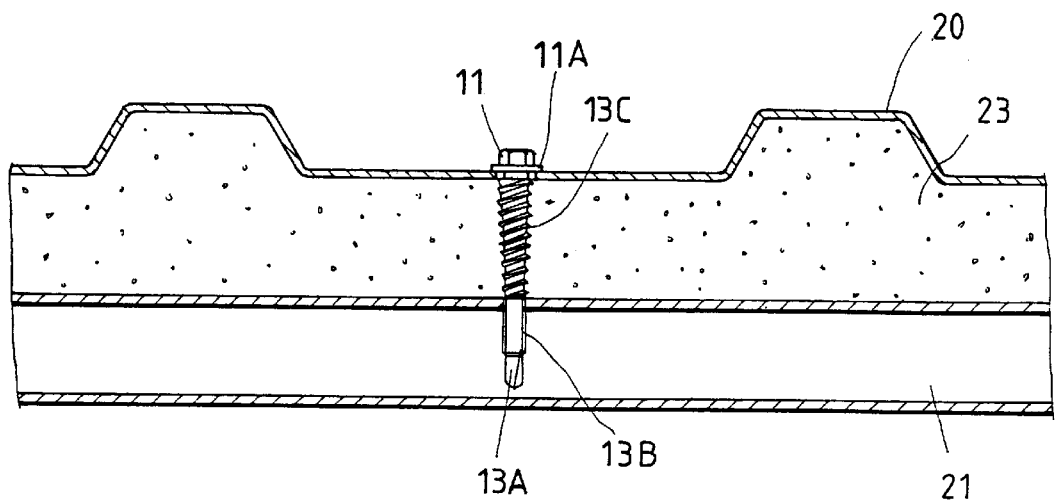
FIG 3 shows a sectional view of the preferred embodiment of the present invention at work.

As shown in FIGS. 1–3, a self-tapping screw 10 embodied in the present invention is composed of a head 11 and a threaded shank 13.

The head 11 is of a hexagonal construction and engageable with a pneumatic wrench. The head 11 has a circular base 11A greater in diameter than the head 11 for increasing the contact area between the head 11 and the surface of a corrugated board 20 onto which the self-tapping screw 10 is fastened, as illustrated in FIG. 3.

The threaded shank 13 is fastened at one end thereof with the head 11 and is provided at another end thereof with a blade 13A to facilitate the penetrating of the threaded shank 13 into the corrugated board 20 and a girder 21.

The head 11 and the blade 13A of the self-tapping screw 10 of the present invention are similar in construction to those of the self-tapping screw of the prior art. The present invention is charaterized in design in that the threaded shank 13 of the present invention is composed of a first threaded portion 13B contiguous to the blade 13A, and a second threaded portion 13C contiguous to the head 11. The second threaded portion 13C has a tooth pitch greater than that of the first threaded portion 13B, and a tooth depth greater than that of the first threaded portion 13B. As a result, the first threaded portion 13B can be forced into the girder 21 more easily in conjunction with the blade 13A such that the second threaded portion 13C is fastened onto the corrugated board 20, and that the circular base 11A of the head 11 is firmly pressed against the outside surface of the corrugated board 20, as shown in FIG. 3, and further that an insulation layer 23 is securely held by the second threaded portion 13C, thanks to the relatively large tooth pitch and tooth depth of the second threaded portion 13C capable of providing a greater fastening contact area. In addition, the second threaded portion 13C is of a tapered construction, with its outer diameter becoming gradually smaller toward the first threaded portion 13B. In the meantime, the first threaded portion 13B is uniform in outer diameter from one end to another. The tapered construction of the second threaded portion 13C is capable of providing different contact areas along the direction of the longitudinal axis of the second threaded portion 13C, so as to enhance the binding force between the second threaded portion 13C and the insulation layer 23.

A shown in FIG. 3, the second threaded portion 13C of the self-tapping screw 10 of the present invention is preferably longer than the first threaded portion 13B such that the second threaded portion 13C is almost completely embedded in the insulation layer 23, and that the first threaded portion 13B is almost completely embedded in the girder 21.

What is claimed is:

1. A self-tapping screw having a head, and a threaded shank fastened at one end thereof with said head and provided at another end thereof with a blade fastened therewith; wherein said threaded shank is provided with a first threaded portion contiguous to said blade, and a second threaded portion contiguous to said head and greater in tooth pitch and tooth depth than said first threaded portion, wherein said second threaded portion is of a tapered construction.

2. The self-tapping screw as defined in claim 1, wherein said head has a circular base fastened with said second threaded portion.

3. The self-tapping screw as defined in claim 1, wherein said second threaded portion is greater in length than said first threaded portion.

\* \* \* \* \*